United States Patent Office 3,143,537
Patented Aug. 4, 1964

3,143,537
OLEFIN POLYMERIZATION USING AN ALUMINUM ALKYL-TRANSITION ELEMENT COMPOUND-ALKALI METAL FLUORIDE CATALYST COMPOSITION
Hugh J. Hagemeyer, Jr., and Marvin B. Edwards, Longview, Tex., assignors to Eastman Kodak Company, Rochester, N.Y., a corporation of New Jersey
No Drawing. Filed Mar. 5, 1959, Ser. No. 797,343
15 Claims. (Cl. 260—93.7)

This invention relates to a new and improved polymerization process and is particularly concerned with the use of a novel catalyst mixture for preparing high molecular weight solid polyolefins, such as polyethylene and polypropylene, of high density and crystallinity. More specifically, the invention is concerned with improved process for polymerizing normally gaseous monoolefins such as ethylene, propylene, or mixtures thereof to give polymers having densities and rigidity higher than those achieved by conventional high pressure polymerization processes and in unusually high yields of polymer per unit of catalyst.

Heretofore, polyethylene was generally prepared by high pressure polymerization techniques which gave highly useful polymers which were relatively flexible and low softening. High pressure polyethylene is further characterized by a relatively high degree of chain branching and a density which is considerably lower than the theoretical density. Usually, pressures in excess of 500 atmospheres and commonly of the order of 1000–1500 atmospheres are employed to effect the polymerization of solid polymers. Such pressures have been necessary even with the use of oxygenated catalysts such as the peroxides.

In recent years, certain organometallic compounds, such as aluminum trialkyls have been proposed as polymerization catalysts for use at relatively low pressures to give polyolefins of unusually high crystallinity and density characteristics. These efforts, however, were not successful for the preparation of high molecular weight polymers when the organometallic compound was employed alone. Subsequent work showed that the use of an activator such as a titanium or zirconium compound greatly increased the activity of the aluminum trialkyls. The use of aluminum trialkyls activated with a transition element compound has been described rather widely for olefin polymerization processes. It is one of the objects of this invention to improve upon those catalysts by adding an additional component to the catalyst mixture and to provide a catalyst that can be used to produce solid, high molecular weight hydrocarbon polymers of increased crystallinity and molecular weight. The improved catalytic mixture also extends the useful life of the catalyst and increases the ultimate yields of polymer per unit of catalyst.

It is another object of this invention to provide an improved process whereby alpha-monoolefins are readily polymerized by a particular catalyst mixture as defined hereinafter to give high molecular weight solid polymers of improved softening temperature, density, crystallinity and stiffness, in unusually high yields per unit of catalyst employed. A particular object of this invention is to provide an improved process for preparing a wide variety of poly-alpha-olefin polymers and copolymers at relatively moderate pressures which, in some cases, range as low as atmospheric pressure, and at temperatures ranging from 50 to 300° C. Another object of this invention is to provide an olefin polymerization process wherein it is possible to direct the reaction to the formation substantially exclusively of highly crystalline, high molecular weight polymer. It is another object of this invention to provide a novel olefin polymerization catalyst of improved reproducibility and considerably less sensitive to the action of impurities. A further object of this invention is to provide a novel olefin polymerization catalyst that can be used to polymerize olefins at surprisingly rapid rates to highly crystalline polymer. Further and additional objects of this invention will be apparent from the detailed description hereinbelow.

These and other objects are attained by means of a process embodying the present invention wherein normally gaseous alpha-monoolefins, either singly or in admixture, are readily polymerized to high molecular weight solid polymers by effecting the polymerization in the presence of a catalytic mixture of an aluminum alkyl, wherein the alkyl radicals contain from 1 to 12 carbon atoms, a compound of a transition element in Groups IV, V and VI of the periodic table, and a halide of an alkali metal. It is preferred to use a catalytic mixture of an aluminum alkyl, a halide of a transition element selected from the group consisting of titanium vanadium, chromium, molybdenum, and zirconium, and a fluoride of an alkali metal selected from the group consisting of sodium, potassium and lithium. It is more specifically preferred to use a catalytic mixture containing aluminum triethyl, titanium tetrachloride and sodium fluoride. The nature of the catalysis of ethylene, propylene, and similar alpha-olefins to form solid high density polymers, appears to be largely empirical, since it is usually impossible to predict what catalyst combinations will work effectively to form the desired product. In the case of the present invention, the results obtained were quite unexpected since the individual components of the catalyst combination are comparatively ineffective for producing a highly crystalline, high molecular weight polymer.

The invention process is preferably carried out in liquid phase with the polymer as a slurry or solution in an inert organic liquid, and preferably an inert hydrocarbon vehicle. However, a diluent is not essential particularly in those instances where the olefin to be polymerized is a liquid at reaction temperature and pressure. The process proceeds with excellent results over a relatively wide temperature range with temperatures of 50–300° C. being preferably employed. The pressure can be varied as desired with pressures as low as atmospheric pressure being operable. Generally speaking, however, it is desirable to employ pressures in the range of 0–5000 p.s.i.g. with moderate pressures of from 300 to 1000 p.s.i.g. being suitable for optimum yield. In some cases, higher pressures such as are employed in the conventional high pressure process can be used but are usually not necessary. Thus, pressures of as much as 20,000 p.s.i.g. or higher can be used in some instances. The liquid vehicle employed is desirably one which serves both as a liquid medium and as a solvent for the solid polymerization product in the temperature range employed.

The polymerization reaction is preferably conducted at a temperature within the range of 50–120° C. and temperatures of 70–95° C. are more preferred. The temperature is usually chosen to produce the desired melt index or intrinsic viscosity in the polymer.

The invention is applicable for polymerizing any of the well known alpha-monoolefinic hydrocarbons and preferably those containing from 2 to 10 carbon atoms. In most cases, the invention is particularly applicable for polymerizing ethylene, propylene, or mixtures thereof, although any of the alpha-monoolefins can be used or any mixture of the alpha-monoolefins depending on the type of product desired. When ethylene is employed as the monomer, the polyethylene obtained has a melting point greater than 130° C. which means that the products prepared therefrom can be readily employed in contact with boiling water without deformation or other deleterious results. The polymers embodying this invention have molecular weights greater than 1000 and usually greater than 10,000. The achievement of extremely high molecular weights does not present a problem from the point of catalytic process herein described, and molecular weights even greater than 1,000,000 can be readily obtained. The high molecular weight, high density polyethylenes of this invention are insoluble in solvents at ordinary temperatures but are partially soluble in such solvents as xylene, toluene, or tetralin at temperatures of about 100° C. With the exception of compounds of extremely high molecular weight, the polyethylenes and polypropylene obtained according to this invention are soluble in most paraffinic or aromatic solvents at 145° C. These solubility characteristics make it possible to carry out the polymerization process under conditions wherein a polymer formed is soluble in the reaction medium during the polymerization and can be precipitated therefrom by lowering the temperature of the resulting mixture. In one of the preferred methods of carrying out the invention the polymer solution is first filtered to remove the catalyst residues and the polymer is then isolated by precipitation or melt concentration techniques.

The polyolefins prepared according to the invention can be molded or extruded into flexible plates or films. The products can be extruded in the form of pipe or tubing of greater rigidity than usual high pressure polyethylene or it can be injection molded into a great variety of articles. The polymers can also be cold drawn into ribbons, bands, fibers, or filaments of high elasticity and rigidity. Fibers of high strength can be spun from molten polyethylene or from molten polypropylene obtained according to this process. Polypropylene prepared by our process has a very high degree of crystallinity and a very high density, and the polymers of other alpha-olefins have similarly improved properties. The process of the invention can also be employed to effect the copolymerization of ethylene with other polymerizable alpha-monoolefins and particularly with propylene, 1-butene, and 1-hexene. Other monoolefins which are suitably employed either alone or in admixture include such materials as butene-1, isobutylene, 1-pentene, 1-hexene, 1-decene, styrene and similar alpha-monoolefins. In some cases, it is desirable to prepare copolymers of the alpha monoolefins in order to modify the properties for particular uses such as in molding or extrusion applications. Thus, copolymers of 5-95 percent propylene are desirably prepared in many cases. A copolymer of ethylene with from 2-10 percent 1-hexene also has desirable properties.

The catalyst combination embodying this invention has several important advantages over the catalyst combinations employed in prior art polymerization processes. For example, the rate of polymerization is much faster than is ordinarily achieved with catalysts known heretofore, and the same degree of polymerization can be achieved in a few hours using the present catalyst system as required several days heretofore. Another advantage of the invention is that relatively lower pressures can be used with pressures as low as atmospheric pressure being operable. Ordinarily, moderate pressures in the order of 300–1000 p.s.i.g. are employed, but the use of such pressures still allows considerable economy over the conventional high pressure processes which operate in the range of 1000–2000 atmospheres in most cases. Another advantage of our catalyst combinations is that they are more readily reproducible than the prior art two-component catalyst systems. The alkali metal halide appears to stabilize the catalyst and to prevent over-reduction of the transition element compound with resulting inactivation of the catalyst. Still another advantage of the catalyst combinations embodying this invention is the fact that they are less sensitive to impurities than the prior art two-component catalyst systems. As a result, higher molecular weights, higher crystallinities and higher yields of polymer per unit of catalyst can be realized consistently with our catalyst even with variations in the purity of the olefin feed and solvents used. Another advantage of the catalyst combinations embodying this invention is the fact that it is possible to direct the polymerization reaction substantially exclusively to the desired highly crystalline, high molecular weight polymer by selection of the proper catalyst components and mixing techniques. With our catalysts it is possible to eliminate substantially completely the formation of less valuable oils and rubbery low molecular weight amorphous polymer.

The only limitation on the temperature at which the process can be effected is the decomposition temperature of the catalyst. In addition, temperature alone is used to control the melt index or molecular weight of the polymer. The pressure employed need only be sufficient to maintain the reaction mixture in liquid form during the polymerization, although moderate pressures are desirable for optimum yield and reaction rates. Since the catalyst mixture employed consists of components which are readily dispersible in organic liquid vehicles commonly employed, the uniformity of reaction can be readily controlled.

Polymerization embodying the invention can be carried out batch-wise or in a continuous flowing stream process. Continuous processes are preferred for economic reasons, and particularly good results are obtained using a continuous process wherein a polymerization mixture of constant composition is continuously and progressively introduced in the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared at low temperatures by batch processes. The ethylene or other alpha-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from 50–300° C. can be employed as desired, it is preferred to use a temperature not in excess of 120° C. If the preparation of the uniform polymer is by the continuous flowing stream process, the temperature is desirably maintained at a substantially constant value within the preferred range in order to acihceve the highest degree of uniformity and as a method of controlling melt index. Since it is desirable to employ a solution of the monomer of relatively high concentration, the process is desirably effected under a pressure of from 300–1000 p.s.i. obtained by pressuring the system with the monomer being polymerized. The amount of vehicle employed can be varied over rather wide limits with relation to the monomer and catalyst mixture. Best results are obtained using a concentration of catalyst from about 0.005 percent to 5 percent by weight of the vehicle. The concentration of the monomer and the vehicle will vary rather widely depending upon the reaction conditions and the particular monomer employed and will usually range from about 2 to 50 percent by weight.

The relative proportions of the various catalyst components can be varied over a wide range. For each mole of transition element halide from 0.5 to 6 moles of alkyl aluminum and from 0.5 to 12 moles or higher of metal halide are used. The polymerization time can be varied from the period of a few minutes or hours to several days.

The organic vehicle employed can be an aliphatic alkane or cycloalkane such as pentane, hexane, heptane, or cyclohexane, or a hydrogenated aromatic compound such as tetrahydronaphthalene or decahydronaphthalene, or a high molecular weight liquid paraffin or mixture of paraffins which are liquid at reaction temperature, or an aromatic hydrocarbon such as benzene, toluene, xylene or the like or a halogenated aromatic compound such as chlorobenzene, chloronaphthalene, or othodichlorobenzene. The nature of the vehicle is subject to considerable variation, although the vehicle employed should be a liquid under the conditions of reaction and completely inert. The hydrocarbon liquids are desirably employed. Other solvents which can be used include ethyl benzene, isopropyl benzene, ethyl toluene, normal propyl benzene, diethyl benzenes, mono- and dialkyl naphthalenes, normal octane, isooctane, methyl cyclohexane, and any of the other well known inert liquid hydrocarbons.

The polymerization ordinarily is accomplished by merely admixing the components of the polymerization mixture and heating to the desired polymerization temperature. This temperature is maintained by heating and cooling as required. When highly uniform polymers are desired employing the continuous process wherein the relative proportion of the various components are maintained substantially constant, temperature is the controlling factor as regards molecular weight and is desirably controlled with a relatively narrow range. This is readily accomplished since the solvent vehicle forms a high percentage of the polymerization mixture and has to be heated or cooled to maintain the temperature as desired.

The catalyst components are usually mixed with each other prior to use in the polymerization reaction, and any order of addition of the various components to the mixture can be used. The aluminum alkyl and the transition element compound can be mixed separately or in the presence of the alkali metal halide. The transition element halide is preferably a titanium chloride, and it is preferred that the transition element be in a reduced form before the catalyst complex is prepared. However, the catalytic mixture can be prepared with the transition element compounds in their maximum state of oxidation. Good results can be obtained by charging the catalyst components separately to the reactor. Alternately, the catalyst components can be mixed as a concentrated slurry in an inert organic solvent or in the pure form and then charged to the polymerization reactor. It is also possible to triturate the catalyst mixture and then wash the triturated mixture with an inert organic solvent until the eluate no longer contains halogen the triturated and elutriated catalyst mixture is then ready for use in the polymerization reaction.

In order to purify the polymer produced in accordance with our process, removal of the catalyst from the polymer can be carried out by various procedures. When the polymerization is conducted at the lower temperatures and a slurry procedure is employed, we have found that catalyst can be removed from the polymer by washing the polymer with hot, anhydrous alcohols, such as isobutyl alcohol. Alternatively, the slurry can be heated to a temperature within the range of 150–250° C. after the polymerization reaction has been completed, and the polymer is soluble in the reaction medium at these higher temperatures. Catalyst can then be separated from the dissolved polymer by filtration. This latter procedure is particularly useful with a catalyst that has been triturated and elutriated in the manner described above.

Our invention is described in further detail in the following illustrative examples.

*Example 1*

A catalyst complex comprised of 4.1 g. of aluminum triethyl, 1.5 g. of sodium fluoride, and 6.9 g. of titanium tetrachloride was added in a nitrogen atmosphere to 500 ml. of heptane contained in a 1-liter 3-neck flask. The flask was fitted with an ethylene inlet tube which fit below the surface of the liquid, a mechanical stirrer, and an ethylene outlet tube. The outlet tube was connected to a mercury seal arranged so as to provide a pressure of 5 p.s.i.g. of ethylene on the reaction mixture. The catalyst slurry was stirred and ethylene was introduced to the inlet tube at a rate such that there was a negligible loss of ethylene through the mercury trap. Polyethylene began to separate as a finely divided powder immediately and the temperature rose rapidly to 60° C. The reaction vessel was cooled in a water bath in order to maintain the temperature at 60° C. for a period of 6 hours.

Two-hundred milliliters of methanol was added to inactivate the catalyst and the product polyethylene was recovered by filtration. The polymer was washed free of solvent and catalyst with several portions of hot, dry isobutyl alcohol. The polyethylene polymer weighed 123 grams, melted at 133–146° C., and had a melt index of 7.6.

*Example 2*

A catalyst complex composed of 4.5 g. of aluminum triethyl, 2.4 g. of potassium fluoride, and 6.9 g. of titanium tetrachloride in 500 ml. of toluene was charged to an autoclave of 1800 ml. capacity. Ethylene was charged in at 500 p.s.i.g. and the autoclave was stirred and heated at 60–70° C. for 6 hours. Fresh ethylene was added to the autoclave in order to maintain a pressure of 500 p.s.i.g. The crude polymer was washed free of catalyst with 2 percent caustic in methanol. It was finally washed with water and dried. The polyethylene weighed 219 grams and melted at 139–151° C. The melt index was 1.74.

*Example 3*

A mixture of 1.5 g. of sodium fluoride, 4.1 g. of aluminum triethyl, and 4.6 g. of titanium tetrachloride in 500 ml. of heptane was stirred for one hour in a flask equipped for polymerization as described in Example 1. Propylene was introduced through the inlet tube for 5 hours while the mixture was vigorously stirred. The reaction temperature was held at 50–60° C. by cooling during the first part of the polymerization and by heating towards the end. The crude polypropylene was purified by washing with methanolic caustic, methanol, and finally with water. The polymer weighed 83 grams, melted at 127–136° C., and had a melt index of 70.

*Example 4*

A catalyst mixture prepared from 4.1 g. of aluminum triethyl, 1.5 g. of sodium fluoride and 6.8 g. of di(2-ethylhexyloxy)titanium dichloride in 500 ml. of heptane was prepared in a nitrogen atmosphere. Ethylene was introduced into the reaction vessel while vigorously agitating and the reaction temperature was held at 50–60° C. by cooling. At the end of 3 hours the catalyst was washed with methanolic caustic, then with methanol and water as previously described, and dried. The product weighed 190 grams and melted at 141–145° C. The melt index was 2.1.

*Example 5*

A catalyst mixture composed of 4.5 g. of aluminum triethyl, 1.7 g. of sodium fluoride, and 5.8 g. of vanadium tetrachloride in 500 ml. of heptane was charged to an 1800-ml. autoclave as described in Example 2. Ethylene was charged in at 500 p.s.i.g. and the polymerization was carried out at 60–70° C. for 6 hours. The polyethylene product, after purification by treatment with methanolic hydrochloric acid, and water, weighed 37 grams, melted at 125–137° C., and had a melt index of 0.12.

*Example 6*

A catalyst complex comprised of 4.1 g. of aluminum triethyl, 1.5 g. of sodium fluoride and 4.8 g. of chromium trichloride was transferred to an 1800-ml. autoclave in 500 ml. of depentanized gasoline and contacted with ethylene as described in Example 2. Treatment of the crude reaction product with methanol, hot glacial acetic acid, and then water, gave 230 grams of polyethylene, melting point 134–140° C. The melt index of the polymer was 0.35.

*Example 7*

A catalyst complex was formed by mixing 4.5 g. of aluminum triethyl, 5.8 g. of vanadium tetrachloride, and 1.7 g. of sodium fluoride in mineral spirits. The catalyst mixture was charged to a 2-liter stirred autoclave and pressured with propylene to 350 p.s.i.g. at 85° C. The polymerization was exothermic and cooling was required to maintain the reaction temperature at 85° C. At the end of 6 hours the polymer slurry was discharged from the autoclave and filtered in a propylene atmosphere. The polypropylene was then washed several times with isobutanol at 105° C. and then dried at reduced pressure. The yield of polypropylene was 378 grams and the polypropylene had a crystallinity of 98 percent and an inherent viscosity as measured in tetralin at 145° C., of 4.1.

*Example 8*

4.6 grams of titanium tetrachloride and 1.7 g. of aluminum triethyl were heated to 70° C. in 100 ml. of mineral spirits. The precipitate was then elutriated with mineral spirits until the eluate gave a negative test for chloride. To the precipitate was added 3.4 g. of aluminum triethyl and 1.5 g. of sodium fluoride and the mixture was thoroughly mixed to form the catalyst complex. The catalyst slurry was diluted to 900 ml. with additional mineral spirits and transferred to a 2-liter stirred autoclave. Propylene was pressured in at 380 p.s.i.g., at 85° C., and the polymerization time was 8 hours. At the end of this time the polypropylene slurry was discharged from the autoclave to a wash tank and filtered in a propylene atmosphere. The polymer cake was then washed with hot, dry isobutanol at 100–107° C. After six washes with isobutanol, the polymer powder was vacuum dried at 80° C. The yield of polypropylene was 310 g. and the crystallinity of the polymer, as measured by exhaustive extraction with hexane, was 97.2 percent. The inherent viscosity of the polypropylene was 2.8.

*Example 9*

A catalyst complex comprised of 1.5 g. of titanium trichloride, 1.2 g. of aluminum triethyl and 2.5 g. of sodium fluoride was charged to a 2-liter autoclave in 900 ml. of mineral spirits. Propylene was charged in at 350 p.s.i.g. and temperature was controlled at 90° C. by heating and cooling as required. At the end of 12 hours the polymer yield was 396 grams. Percent crystallinity 99.1; inherent viscosity 3.8.

In a similar run substituting 3.0 g. of sodium chloride for the sodium fluoride, the yield was 402 grams; crystallinity 96 percent; inherent viscosity 2.6.

In a similar run with no alkali metal halide the yield was 131 grams; crystallinity 88 percent; inherent viscosity 2.0.

*Example 10*

A catalyst complex comprised of 1.56 g. of vanadium trichloride, 1.2 g. of aluminum triisobutyl and 1.5 g. of lithium fluoride was charged to a 2-liter stirred autoclave in mineral spirits. Propylene was polymerized at 300 p.s.i.g. at 75° C. for 6 hours. Yield, 285 grams; percent crystallinity, 97; inherent viscosity, 4.9.

Although the invention has been described in considerable detail with reference to certain preferred embodiments thereof, variations and modifications can be effected within the spirit and scope of the invention as described hereinabove and as defined in the appended claims.

We claim:

1. As a composition of matter, a catalyst for the polymerization of proplene to solid crystalline polymer, comprising aluminum triethyl, vanadium tetrachloride and sodium fluoride, said catalyst containing from 0.5 to 12 moles of sodium fluoride per mole of vanadium tetrachloride.

2. As a composition of matter, a catalyst for the polymerization of propylene to solid crystalline polymer, said catalyst being substantially free of unreacted halide and having been prepared by reacting aluminum triethyl, titanium tetrachloride and sodium fluoride, from 0.5 to 12 moles of sodium fluoride per mole of titanium tetrachloride having been used in said reaction.

3. As a composition of matter, a catalyst for the polymerization of propylene to solid crystalline polymer, said catalyst being substantially free of unreacted halide and having been prepared by reacting aluminum triethyl, vanadium tetrachloride and sodium fluoride, from 0.5 to 12 moles of sodium fluoride per mole of vanadium tetrachloride having been used in said reaction.

4. As a composition of matter a catalyst for the polymerization of propylene to solid crystalline polymer, said catalyst being substantially free of unreacted halide and having been prepared by reacting from 0.5 to 6 moles of aluminum triethyl and from 0.5 to 12 moles of sodium fluoride per mole of titanium tetrachloride.

5. As a composition of matter, a catalyst for the polymerization of α-monoolefinic hydrocarbons containing 3 to 10 carbon atoms to solid crystalline polymer, said catalyst being substantially free of unreacted halide and having been prepared by reacting an aluminum trialkyl wherein the alkyl radicals contain from 1 to 12 carbon atoms, a halide of a transition metal selected from the group consisting of titanium, vanadium, chromium, molybdenum and zirconium and alkali metal fluoride from 0.5 to 12 moles of alkali metal fluoride per mole of transition metal having been employed in said reaction.

6. As a composition of matter, a catalyst for the polymerization of α-monoolefinic hydrocarbons containing 3 to 10 carbon atoms to solid crystalline polymer, said catalyst being substantially free of unreacted halide and having been prepared by reacting an aluminum trialkyl wherein the alkyl radicals contain from 1 to 12 carbon atoms, a titanium halide and an alkali metal fluoride, from 0.5 to 12 moles of alkali metal fluoride per mole of titanium fluoride having been employed in said reaction.

7. As a composition of matter, a catalyst for the polymerization of α-monoolefinic hydrocarbons containing 3 to 10 carbon atoms to solid crystalline polymer, said catalyst being substantially free of unreacted halide and having been prepared by reacting an aluminum trialkyl wherein the alkyl radicals contain from 1 to 12 carbon atoms, a titanium chloride and an alkali metal fluoride, from 0.5 to 12 moles of alkali metal fluoride per mole titanium chloride having been employed in said reaction.

8. The process for producing a catalyst for the polymerization of propylene to solid crystalline, which comprises reacting from 0.5 to 6 moles of aluminum triethyl and 0.5 to 12 moles of sodium fluoride with each mole of titanium tetrachloride and washing resulting reaction mixture with an inert liquid saturated aliphatic hydrocarbon until the wash liquid is free of halide.

9. A process for the polymerization of α-monoolefinic hydrocarbons containing 3 to 10 carbon atoms to solid crystalline polymer which comprises contacting said hydrocarbon with a catalytic mixture substantially free of unreacted halide and having been prepared by reacting an aluminum trialkyl wherein the alkyl radicals contain from 1 to 12 carbon atoms, a halide of a transition metal selected from the group consisting of titanium, vanadium, chromium, molybdenum and zirconium and an alkali metal fluoride, from 0.5 to 12 moles of alkali metal fluoride per mole of transition metal halide having been employed in said reaction.

10. A process for the polymerization of an α-monoolefinic hydrocarbon containing 3 to 10 carbon atoms to solid crystalline polymer which comprises contacting said hydrocarbon with a catalytic mixture substantially free of unreacted halide, said catalytic mixture having been prepared by reacting an aluminum trialkyl wherein the alkyl radicals contain from 1 to 12 carbon atoms, a titanium halide and an alkali metal fluoride, from 0.5 to 12 moles of alkali metal fluoride per mole of titanium halide having been employed in said reaction.

11. A process for the polymerization of an α-mono-olefinic hydrocarbon containing 3 to 10 carbon atoms to solid crystalline polymer which comprises contacting said hydrocarbon with a catalytic mixture substantially free of unreacted halide, said catalytic mixture having been prepared by reacting an aluminum trialkyl wherein the alkyl radicals contain from 1 to 12 carbon atoms, a titanium chloride and an alkali metal fluoride, from 0.5 to 12 moles of alkali metal fluoride per mole of titanium chloride having been employed in said reaction.

12. A process for the polymerization of propylene to solid crystalline polymer which comprises contacting propylene with a catalytic mixture substantially free of unreacted halide and having been prepared by reacting aluminum triethyl, titanium tetrachloride and sodium fluoride, from 0.5 to 12 moles of sodium fluoride per mole of titanium tetrachloride having been employed in said reaction.

13. A process for the polymerization of propylene to solid crystalline polymer which comprises contacting propylene with a catalytic mixture substantially free of unreacted halide and having been prepared by reacting aluminum triethyl, vanadium tetrachloride and sodium fluoride, from 0.5 to 12 moles of sodium fluoride per mole of vanadium tetrachloride having been employed in said reaction.

14. A process for the polymerization of propylene to solid crystalline polymer which comprises contacting propylene in an inert hydrocarbon diluent at a temperature within the range of 50 to 120° C. with a catalytic mixture substantially free of unreacted halide and having been prepared by reacting aluminum triethyl, titanium tetrachloride and sodium fluoride, from 0.5 to 12 moles of sodium fluoride per mole of titanium tetrachloride having been employed in said reaction.

15. A process for the polymerization of propylene to solid crystalline polymer which comprises contacting propylene at a temperature within the range of 50 to 120° C. in an inert saturated aliphatic hydrocarbon diluent with a catalytic mixture substantially free of unreacted halide and having been prepared by reacting 0.5 to 6 moles of aluminum triethyl and 0.5 to 12 moles of sodium fluoride per mole of titanium tetrachloride.

References Cited in the file of this patent

UNITED STATES PATENTS

| | | |
|---|---|---|
| 2,721,189 | Anderson et al. | Oct. 18, 1955 |
| 2,794,002 | Haensel et al. | May 28, 1957 |
| 2,822,357 | Brebner et al. | June 5, 1957 |
| 2,824,145 | McCall et al. | Feb. 18, 1958 |
| 2,836,570 | Peers | May 27, 1958 |
| 2,846,427 | Findlay | Aug. 5, 1958 |
| 2,862,917 | Anderson et al. | Dec. 2, 1958 |
| 2,899,413 | Hagemeyer et al. | Aug. 11, 1959 |
| 2,909,511 | Thomas | Oct. 20, 1959 |
| 2,925,410 | Coover | Feb. 16, 1960 |
| 2,999,086 | Fasce et. al. | Sept. 5, 1961 |

FOREIGN PATENTS

| | | |
|---|---|---|
| 785,314 | Great Britain | Oct. 23, 1957 |
| 526,101 | Italy | May 14, 1955 |
| 549,466 | Belgium | Jan. 11, 1957 |